United States Patent [19]

Spietschka et al.

[11] 4,224,222
[45] Sep. 23, 1980

[54] PROCESS FOR PREPARING COPPER PHTHALOCYANINE PIGMENTS OF THE α-MODIFICATION

[75] Inventors: Ernst Spietschka, Oberauroff; Siegfried Schiessler; Wolfgang Tronich, both of Frankfurt am Main, all of Fed. Rep. of Germany

[73] Assignee: Hoechst Aktiengesellschaft, Frankfurt am Main, Fed. Rep. of Germany

[21] Appl. No.: 953,185

[22] Filed: Oct. 20, 1978

Related U.S. Application Data

[63] Continuation of Ser. No. 529,521, Dec. 4, 1974, abandoned.

[30] Foreign Application Priority Data

Dec. 6, 1973 [DE] Fed. Rep. of Germany ....... 2360793

[51] Int. Cl.² ............................................. C09B 47/04
[52] U.S. Cl. ..................................... 260/314.5; 8/661
[58] Field of Search ................................ 260/314.5

[56] References Cited

U.S. PATENT DOCUMENTS

| | | | |
|---|---|---|---|
| 2,284,685 | 6/1942 | Detrick et al. | 260/314.5 |
| 2,556,727 | 6/1951 | Lane et al. | 260/314.5 |
| 2,602,800 | 7/1952 | Barnhart | 260/314.5 |
| 3,004,986 | 10/1961 | Kirby et al. | 260/314.5 |
| 3,127,412 | 3/1964 | Gaertner et al. | 260/314.5 |
| 3,758,321 | 9/1973 | Santimauro et al. | 260/314.5 X |
| 3,775,149 | 11/1973 | Langley et al. | 260/314.5 X |

FOREIGN PATENT DOCUMENTS

2211514 7/1974 France ................................. 260/314.5

OTHER PUBLICATIONS

Moser et al., Phthalocyanine Compounds, (1963), pp. 153, 154 and 183.

*Primary Examiner*—Richard Raymond
*Attorney, Agent, or Firm*—Curtis, Morris & Safford

[57] ABSTRACT

This invention relates to a process for the preparation of a very pure copper phthalocyanine pigment of the α-modification which comprises dissolving crude copper phthalocyanine in a 80 to 86% sulfuric acid isolating the copper phthalocyanine sulfate formed, hydrolizing the sulfate and grinding the copper phthalocyanine thus obtained in an aqueous-organic medium.

4 Claims, No Drawings

PROCESS FOR PREPARING COPPER PHTHALOCYANINE PIGMENTS OF THE α-MODIFICATION

This is a continuation, of application Ser. No. 529,521, filed Dec. 4, 1974, now abandoned.

The German Offenlegungsschrift No. 2,262,911 relates to a process for preparing very pure copper phthalocyanine pigments of the α-modification, wherein substituted or unsubstituted copper phthalocyanine having different degrees of purity are converted with suitable acids into the copper phthalocyanine salts capable of being isolated, wherein these salts, after separation from these acids, are converted by the action of water into the pure optionally substituted copper phthalocyanine of the α-modification and the copper phthalocyanine isolated is subjected in an aqueous suspension to a mechanical fine division.

When, in the case of halogenated copper phthalocyanines of the α-modification, the mechanical fine division is performed in a aqueous medium, valuable pigments are obtained which are suitable for all applications, but are especially distinguished by a high transparency and color strength.

It has now been found that a further improvement of quality is obtained, especially with regard to the dispersability and the ability for coloring plastics, when halogenated copper phthalocyanine which has been subjected to the purification process described in the German Offenlegungsschrift No. 2,262,911 and which is present in the form of the aqueous filter cake, is subjected to a mechanical fine division, not in aqueous but in aqueous-organic, preferably aqueous alcoholic media.

Halogenated copper phthalocyanines are above all copper phthalocyanine having a content of chlorine of up to 6%, preferably 2.5 to 6%, as well as lower brominated copper phthalocyanines, which may be further substituted. As substituents there are considered for example sulfonic acid groups, whereby the content of sulfur should not exceed 0.1%. On principle, this process can also be applied to unsubstituted copper phthalocyanine.

As organic components of the grinding medium there are considered all compounds which form solutions or emulsions with water under the grinding conditions.

These types of compounds are for example alcohols, phenols, esters, ketones, carboxylic acids, carboxylic acid amides, nitriles, amines, ethers and hydrocarbons which may be halogenated or nitrated.

As organic components of the grinding medium there are preferred primary, secondary or tertiary aliphatic or cycloaliphatic alcohols having 3 to 6 carbon atoms.

Isopropanol, isobutanol, tert.-butanol or cyclohexanol have proved to be especially suitable.

These organic compounds preferably used are expediently used in the form of aqueous mixtures having a content of 2 to 10% of the organic compound.

Grinding is effected according to the conditions usual in practice and described in German Offenlegungsschrift No. 2,262,911.

The pigment is isolated from the grinding suspension by filtration, but the pigment is preferably isolated by evaporation. As compared with the pigments obtained according to the German Offenlegungsschrift No. 2,262,911 the pigments obtained according to the present process are distinguished by an improved dispersability in stoving enamels, the tinctorial strength being the same. Furthermore, the pigments obtained are characterized by an excellent dispersability and a high tinctorial strength in PVC.

This result was not expected, since, when grinding copper phthalocyanine of the α-modification in a predominantly organic medium pigments of considerably inferior technical properties are obtained.

The pigments prepared according to the process claimed are suitable for coloring paper, plastics, synthetic resins and synthetic fibers in the mass, for coloring lacquers, for printing paper and textiles, for paints and inks as well as for metal effect lacquerings.

The following Examples illustrate the invention. Parts and percentages are by weight unless stated otherwise.

EXAMPLE 1

46 parts of crude copper phthalocyanine (90%) were chlorinated in 400 parts of oleum with chlorine gas having a content of chlorine of 3%. When chlorination was finished the copper phthalocyanine sulfate was precipitated according to the process described in German Offenlegungsschrift No. 2,262,911, by reducing the acid concentration with water to 86%, it was isolated and hydrolized with water. The thus obtained pure copper phthalocyanine containing chlorine was suction-filtered and washed free from acid. A dried sample had a content of chlorine of 3% and a content of sulfur of 0.04%.

87 Parts of the 46% aqueous filter cake thus prepared were ground after addition of a mixture of 142 parts of water and 15 parts of isobutanol, corresponding to a 7.4% aqueous isobutanol solution, in a porcelain mill with 1300 parts of quartzite perls (diameter 1 mm) for 15 hours on a vibration table. Subsequently the grinding elements were separated from the grinding good and the pigment suspension was evaporated until dry at 60° to 70° C. 40 Parts of a pure pigment were obtained.

The pigment thus prepared dyed stove enamels in brilliant intense reddish blue shades and were characterized-with regard to known commercial preparations-by a considerably higher color intensity and a better dispersability.

The PVC colorations obtained according to known methods are characterized by a high tinctorial strength, a pure shade and a very intense reddish blue shade.

If instead of 15 parts of isobutanol 15 parts of tertiary butanol or 7 parts of cyclohexanol were used for grinding, pigments having a comparable quality were obtained.

Instead of a swing mill a perl mill may also be used for grinding. The pigments prepared have also excellent properties.

EXAMPLE 2

Example 2 was carried out according to Example 1, but instead of 15 parts of isobutanol 30 parts of isobutanol were added for grinding, the other amounts remaining the same.

The pigment thus prepared had a comparable quality as the pigments prepared according to Example 1.

EXAMPLE 3

Example 3 was carried out according to Example 1, with the difference that the chlorination of the copper phthalocyanine was effected with a content of chlorine of 5.8% (The content of sulfur of the copper phthalocyanine was 0.06%).

The dyeings of stove enamels and PVC obtained with the pigment thus obtained have a high tinctorial strength and a pure reddish shade. As compared with known products the pigment had a considerably better color intensity and a better dispersability.

EXAMPLE 4

Example 4 was carried out according to Example 1; but in this case the aqueous filter cake of a phthalocyanine having a content of chlorine of 3%, which was prepared by co-condensation of the 4-chlorophthalic acid anhydride, phthalic acid anhydride, urea and copper sulfate in nitrobenzene and subsequently purified over the copper phthalocyanine sulfate, was used for grinding.

The pigment thus obtained dyed stove enamels and PVC in pure reddish blue shades having a high tinctorial strength. The dispersability of the pigment was excellent.

We claim:

1. In a process for the preparation of a very pure halogenated copper phthalocyanine pigment of the α-modification wherein halogenated copper phthalocyanine is converted into its sulfate and said sulfate is isolated and then hydrolyzed, the improvement comprising the step of grinding the so-obtained halogenated copper phthalocyanine of the α-modification, without intermediate drying, in an aqueous solution of 2 to 10% by weight of an aliphatic or cycloaliphatic alcohol having 3 to 6 carbon atoms.

2. The process as claimed in claim 1, wherein the halogenated copper phthalocyanine contains up to 6% of chlorine.

3. The process as claimed in claim 1, wherein the halogenated copper phthalocyanine contains 2.5 to 6% of chlorine.

4. The process as claimed in claim 1, wherein the organic compound is isopropanol, isobutanol, tert.-butanol or cyclohexanol.

* * * * *